United States Patent Office 3,072,614
Patented Jan. 8, 1963

3,072,614
POLYURETHANE COMPOSITIONS
Benjamin A. Bolton, Gary, Ind., assignor to Standard Oil Company, Chicago, Ill., a corporation of Indiana
No Drawing. Filed Jan. 29, 1960, Ser. No. 5,356
14 Claims. (Cl. 260—77.5)

This invention relates to polyurethane compositions and particularly it relates to polyurethane compositions made from glycol triesters of benzene tricarboxylic acids and organic diisocyanates.

The polyurethane compositions of the invention are made by reacting a hereinafter defined glycol triester of a benzene tricarboxylic acid with an organic diisocyanate. The glycol triester used in the reaction has an acid number from about 0 to not more than 30.

A wide variety of hereinafter defined glycol triesters of benzene tricarboxylic acids may be utilized in making the compositions of the invention. The acid portion of the triester may be derived from trimellitic acid, trimesic acid, and/or hemimellitic acid. The preferred esters are derived from trimellitic acid and trimesic acid.

The glycol portion of the triester of the benzene tricarboxylic acid may be derived from ethylene glycol, propylene glycol, diethylene glycol, triethylene glycol, butanediol, heptanediol, or poly-glycolethers such as polyethylene glycol and polypropylene glycol having an average molecular weight as high as 4000. Advantageously, the glycol constituent of the triester is a glycol having from 2 to 12 carbon atoms; preferred glycols are diethylene glycol, triethylene glycol, and 1,4-butanediol.

The defined triester may be purchased as a true triester compound or it may be prepared by reacting the desired glycol and the desired benzene tricarboxylic acid or anhydride. An "ester product" suitable for use in the invention may be prepared by reacting from 2.9 to 3.5 moles of glycol per mol of acid; preferably from about 3.0–3.3 moles of glycol per mole of acid. Any of the benzene tricarboxylic acids or anhydrides may be used: trimellitic acid, trimesic acid, hemimellitic acid, trimellitic anhydride, hemimellitic anhydride.

The temperature employed for preparing the defined esters is from about 300° F. to about 550° F., preferably from about 400° F. to about 500° F. The time required for the reaction will vary depending upon the reactants; the time should be sufficient to yield a product having the desired acid number in the range of from 0 to not more than 30.

The preparation of the defined ester may be advantageously carried out in an inert atmosphere. It is beneficial to provide for removal of water of reaction during the esterification reaction.

A wide variety of organic diisocyanate compounds may be utilized in making the compositions of the invention. The compound may be an aromatic diisocyanate such as tolylene diisocyanate, naphthalene diisocyanate, phenylene diisocyanate, diphenyl methane diisocyanate; a substituted aromatic diisocyanate such as methoxyphenylene diisocyanate, phenoxy phenylene diisocyanate, chlorophenylene diisocyanate; or an aliphatic compound such as hexamethylene diisocyanate, tetramethylene diisocyanate, cyclohexylene diisocyanate. Advantageously, the diisocyanate is aromatic; a preferred diisocyanate is tolylene diisocyanate.

In the preparation of the polyurethane compositions of the invention, the ratio of the defined ester to the diisocyanate is usually from about 0.5 mole to about 1.5 moles; preferably from about 0.6 mole to about 1.2 moles.

The time and temperature required for the reaction of the defined ester with the diisocyanate varies with the different compounds. In general, a temperature from about 150° F. to about 300° F. and a time of reaction from 1 hour to 12 hours are employed. The defined ester and diisocyanate may be mixed at room temperature for from 10 to 30 minutes and then heated to complete the reaction. This two step method of reaction is particularly advantageous when an amine catalyst is used; tertiary amines are a preferred catalyst.

Many amines, particularly tertiary amines, are known to be useful in reactions to form polyurethane. Suitable amines include triethylamine, dimethylethanolamine, diethylcyclohexylamine, dimethylhexadecylamine, dimethylcetylamine, pyridine; substituted pyridines such as 2-(ethanol) pyridine, 2-(propanol) pyridine, 2-(5-nonyl) pyridine, 2-benzyl pyridine, 4-benzyl pyridine, 2,6-butidine; quinoline and substituted quinoline such as 3-methyl isoquinoline; morpholine and substituted morpholines such as N-methyl morpholine, N-ethyl morpholine, and N-coco morpholine. The catalyst is employed in an amount from 0.1 to 3.0 weight percent, preferably 0.5 to 2.0 percent based on weight of the glycol triester.

The polyurethane compositions of the invention are useful in coatings, foams, and adhesives. The compositions may be used alone or in compositions with various fillers and additives known in the polyurethane art; for example carbon black.

Example I 19.2 grams of trimellitic anhydride (0.1 mole) and 45 grams of triethylene glycol (0.3 mole) were placed in a flask provided with agitation and a nitrogen atmosphere. Provision was made for removal of water of reaction. The contents of the flask were heated at a temperature of from 420 to 440° F. for 2½ hours. The acid number of the ester product was 25.

2½ grams of tolylene diisocyanate, a commercial mixture containing 80% of the 2,4-isomer and 20% of the 3,6-isomer (0.014 mole), and 10 grams of the triethylene glycol ester product and 3 drops of an amine catalyst (Selectofoam 6202 made by Pittsburgh Plate Glass Co.) were mixed by simple stirring in a beaker. Considerable heat of reaction was evolved. After a few minutes reaction time, a film was coated on tin plate and a small quantity was poured into an aluminum dish. The film and the material in the dish were heated for ½ hour at 260° F. The film and the material in the dish were soft and spongy.

Example II 5 grams of tolylene diisocyanate (0.28 mole) and 10 grams of the triethylene glycol ester product prepared in Example I and 3 drops of an amine catalyst (Selectofoam 6202) were reacted and treated as in Example I. The cured film was very hard and had excellent flexibility.

The material cast in the aluminum dish foamed considerably and was execeptionally tough and hard. When struck by a sharp hammer blow the material compressed and did not shatter.

Example III 50 grams of triethylene glycol (0.33 mole) and 19.2 grams (0.1 mole) of trimellitic anhydride were placed in a flask provided with agitation and a nitrogen atmosphere. Provision was made for removal of water of reaction. The contents of the flask were heated at a temperature of 415° F. for 2½ hours. The acid number of the ester product was 15.5.

5 grams of tolylene diisocyanate (0.028 mole) and 10 grams of the triethylene glycol ester product were reacted and treated as in Example I.

The product was similar to that of Example II but slightly more brittle.

Example IV 4 grams of tolylene diisocyanate (0.023 mole) and 10 grams of the triethylene glycol ester product prepared in Example III were reacted and treated as in Example I.

The film cast on tin plate had excellent flexibility and hardness.

Thus having described the invention what is claimed is:

1. A polyurethane composition consisting of the polyurethane reaction product of (I) a triester of an unsubstituted benzene tricarboxylic acid and a glycol, said glycol having a molecular weight of not more than about 4,000, and (II) an organic diisocyanate, in an amount of from about 0.5 to about 1.5 moles of said triester per mole of said diisocyanate, at an elevated reaction temperature for time sufficient to produce a polyurethane reaction product.

2. The composition of claim 1 wherein said glycol is ethylene glycol.

3. The composition of claim 1 wherein said glycol is triethylene glycol.

4. The composition of claim 1 wherein said acid is trimellitic acid.

5. The composition of claim 1 wherein said acid is trimesic acid.

6. The composition of claim 1 wherein said diisocyanate is an aromatic diisocyanate.

7. The composition of claim 1 wherein said ester is the ethylene glycol triester of trimellitic acid.

8. The composition of claim 1 wherein said ester is the triethylene glycol triester of trimellitic acid.

9. A polyurethane composition consisting of the polyurethane reaction product of (I) a triester product prepared by reacting a benzene tricarboxylic acid selected from the class consisting of unsubstituted benzene tricarboxylic acids and anhydrides thereof with a glycol having 2 to 12 carbon atoms, in the ratio of 2.90 to 3.5 moles of glycol per mole of acid at a temperature from about 300° F. to about 550° F., said triester product having an acid number of not more than 30, and (II) an organic diisocyanate in an amount of from about 0.6 to about 1.2 moles of said triester produce per mole of said diisocyanate, at an elevated temperature for time sufficient to produce a polyurethane reaction product.

10. The composition of claim 9 wherein said acid is trimellitic anhydride.

11. The composition of claim 9 wherein said acid is trimesic acid.

12. The composition of claim 9 wherein said glycol is triethylene glycol.

13. The composition of claim 9 wherein said glycol is 1,4-butanediol.

14. A polyurethane composition consisting of the polyurethane reaction product of (I) a triester product prepared by reacting a benzene tricarboxylic acid selected from the class consisting of trimellitic anhydride and trimellitic acid with triethylene glycol in the ratio of about 3.0–3.3 moles of said gylcol per mole of acid at a temperature of 400–440° F., said triester product having an acid number from about 10 to about 30, and (II) tolylene diisocyanate in a ratio of from about 0.6 to about 1.2 moles of said triester product per mole of said diisocyanate, said reactants being reacted at ordinary temperature for about 10 minutes and then for about one-half hour at 260° F.

References Cited in the file of this patent

UNITED STATES PATENTS 2,929,794    Simon et al. _____ Mar. 22, 1960

FOREIGN PATENTS 206,295    Australia _____ Feb. 10, 1955
57,722    Netherlands _____ June 15, 1946